United States Patent
Dimmick, III et al.

[11] Patent Number: 5,388,963
[45] Date of Patent: Feb. 14, 1995

[54] FLANGE FOR HIGH SPEED ROTORS

[75] Inventors: John H. Dimmick, III, Jupiter, Fla.; Robert A. Ress, Jr., Carmel, Ind.

[73] Assignee: United Technologies Corporation, Harford, Conn.

[21] Appl. No.: 87,542

[22] Filed: Jul. 2, 1993

[51] Int. Cl.⁶ .................. F01D 5/06; F16B 43/00
[52] U.S. Cl. ................. 416/198 A; 416/201 R; 415/199.5; 411/124; 403/337
[58] Field of Search .......... 416/198 A, 200 A, 201 R; 415/199.4, 199.5; 403/337, 338, 335; 411/122, 123, 124, 169

[56] References Cited

U.S. PATENT DOCUMENTS

| | | | |
|---|---|---|---|
| 1,374,054 | 4/1921 | Bridge | 411/124 |
| 1,512,551 | 10/1924 | McDonald | 411/124 |
| 2,662,685 | 12/1953 | Blanc | 416/198 A |
| 3,249,293 | 5/1966 | Koff | 416/198 A |
| 3,765,795 | 10/1973 | Koff | 416/198 A |
| 4,787,791 | 11/1988 | Lambousy et al. | 411/124 |
| 4,844,694 | 7/1989 | Naudet | 416/198 A |
| 5,052,891 | 10/1991 | Burkholder | 416/198 A |

FOREIGN PATENT DOCUMENTS

| | | | |
|---|---|---|---|
| 339051 | 12/1930 | United Kingdom | 411/123 |
| 2057617 | 4/1981 | United Kingdom | 416/198 A |

Primary Examiner—Edward K. Look
Assistant Examiner—James A. Larson
Attorney, Agent, or Firm—Norman Friedland

[57] ABSTRACT

The span of the overhung flanges at the rim of the disks of gas turbine engine's compressors are minimized by slotting the one of the adjacent flanges at the distal end to receive the bolt head of the attaching bolt and including an anti-rotational clip allowing the nut to be fastened without the necessity of holding the bolt head. The complementing flange of the adjacent rotor includes mating holes. The anti-rotational clip includes bendable tangs bent in situ to engage the flats of the bolt head and a bent tang to fit snugly into the when radially inserted therein slot.

12 Claims, 3 Drawing Sheets 5,388,963

FLANGE FOR HIGH SPEED ROTORS

This invention was made under a U.S. Government contract and the Government has rights herein.

TECHNICAL FIELD

This invention relates to rotors for compressors of gas turbine engines and particularly to the construction of the rotors for attaching adjacent rotors to form rotor spools.

BACKGROUND ART

It is well known that multi-stage compressor rotor disks for gas turbine engines are joined together into rotor spools by welding or bolting adjacent disks. Certain prior art rotors were attached by locating the holes in the disks and bolting the adjacent disks through the holes. For example, U.S. Pat. No. 3,249,293 granted to B. L. Koff on May 3, 1966, U.S. Pat. No. 3,597,110 granted to R. J. Corsmeier on Aug. 3, 1969, and U.S. Pat. No. 4,310,286 granted to G.P. Peters, et al on Jan. 12, 1982 disclose different arrangements for attaching adjacent rotors by locating the bolt hole in the rim of the disk.

Obviously, the bolt holes in the disk or rim of the disk present a stress concentration problem and result in low fatigue life of the assembly. To avoid locating the bolt holes in the blade load carrying portion of the disks, an overhung flange at the rim of the disks was resorted to. For example, U.S. Pat. No. 3,765,795 granted to B. L. Koff on Oct. 16, 1973 and U.S. Pat. No. 3,688,371 granted to B. L. Koff on Sep. 5, 1972 disclose overhung flanges for attaching adjacent rotors.

Obviously, better fatigue life can be achieved by moving the hole away from the disk where the stresses are lower. In certain embodiments this affords the opportunity to shield the flange location by the use of scallops. However, the offset between the flange and the disk web required to obtain access to the bolt puts a large bending load into the web. One method of reducing the bending stress in the web is by offsetting the disk rim to let the blade load counter the bolt load. But, as is apparent to one skilled in this art, the offset adds weight to the disk and the larger the offset required, it follows, that the heavier the disk becomes.

We have found that we can reduce the offset by incorporating a slotted flange that requires the minimal of space and thereby reducing the weight of the rotor when compared to heretofore known designs.

SUMMARY OF THE INVENTION

As object of this invention is to provide an improved rotor design in a multi-stage compressors for gas turbine engines.

A feature of this invention is to provide a scallop overhung flange that complements the adjacent flange to attach both rotors.

A feature of this invention is to provide a complementary overhung flange in the adjacent rotor that includes scallops and bolt holes that complement the slots in the adjacent flange.

A still further feature of this invention is to provide novel means for preventing rotation of the bolt head to allow the nut to be attached to the bolt during assembly.

The foregoing and other features of the present invention will become more apparent from the following description and accompanying drawings.

BEST MODE FOR CARRYING OUT THE INVENTION

Figure 1:
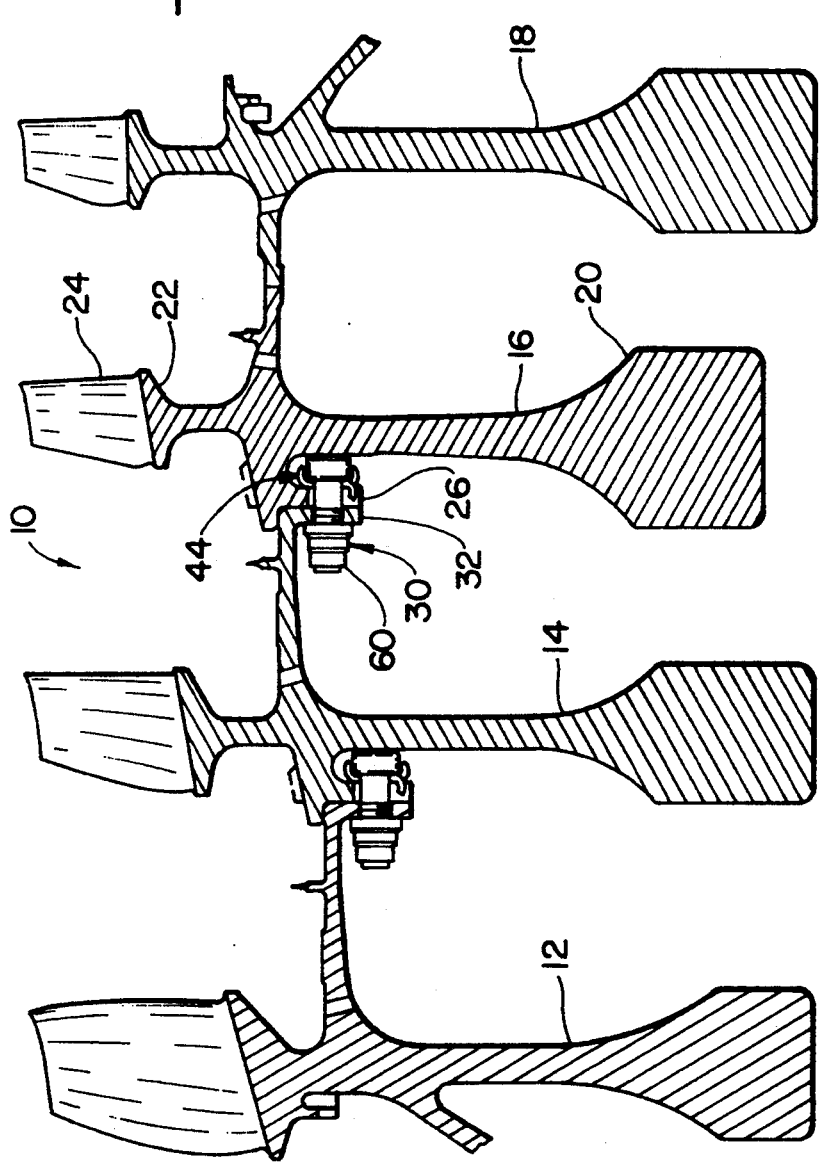
FIG. 1 is a partial view of a multi-stage compressor of a gas turbine engine showing adjacent rotors in section utilizing this invention.

While this invention is described in its preferred embodiment for attaching adjacent rotors of the compressor section of a gas turbine engine it will be understood by those skilled in the art that the invention can be employed in other environments having multiple rotors requiring attachment means. The invention can best be understood by referring to FIGS. 1–5 showing a portion of the multi-stage compressor of a gas turbine engine (not shown) generally indicated by reference numeral 10 showing four (4) rows of the several rows of the rotor disks 12, 14, 16, and 18. Each of the rotors consists of the rotor disks 20, rim 22, blade 24 and an overhung flange 26 (one of the rotors designated as Being illustrative). As noted rotor 16 is attached to the adjacent rotor 14 by a plurality of nut and bolt assemblies 30 attaching overhung flange 26 to overhung flange 32 of rotor 14.

Not shown are the stator vanes that are mounted between rotors and serve to direct the air discharging from the upstream rotor to the downstream rotor with the proper or ultimate angle of attack. As is well known the stator includes a plurality of circumferentially spaced vanes that are aerodynamically shaped to minimize the vortices in the airstream and direct the air to the blades of the adjacent rotor.

Figure 2:
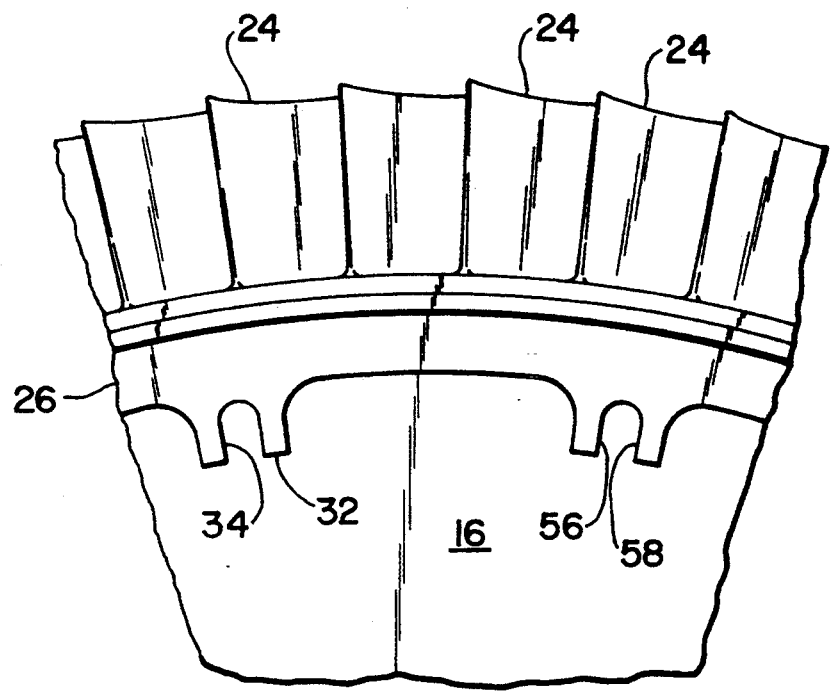
FIG. 2 is a partial side elevation view of illustrating the overhung flange of an adjacent rotor.
Figure 3:
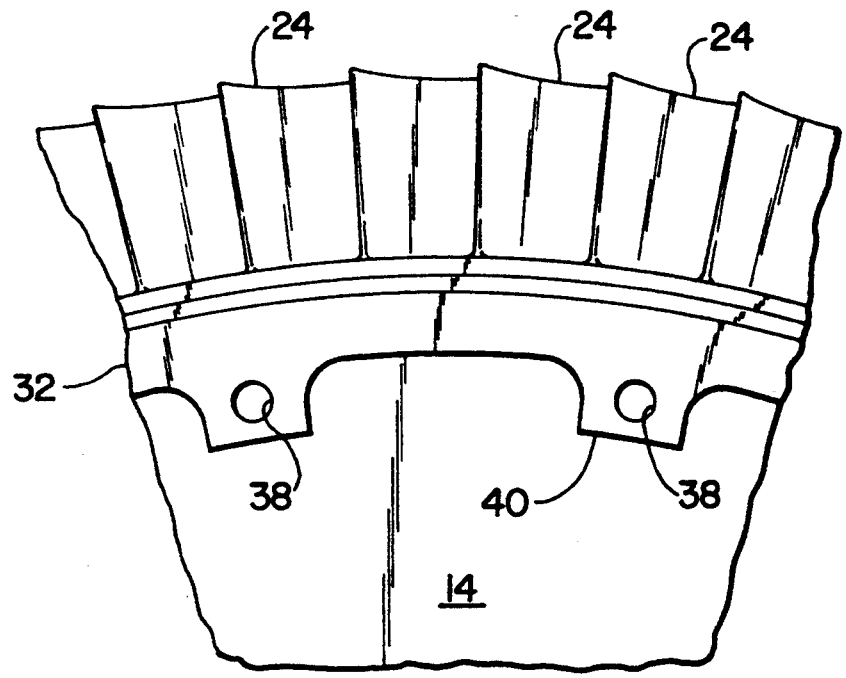
FIG. 3 is a partial side elevation view of the overhung flange of the adjacent rotor with the mating overhung flange.
Figure 6:
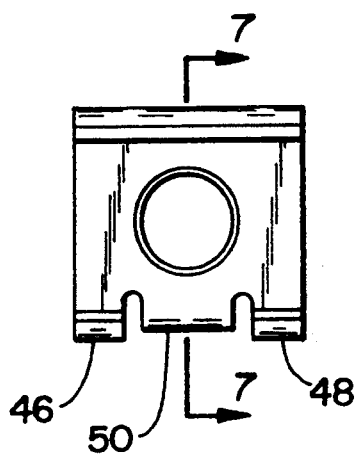
FIG. 6 is a plan view of the anti-rotation clip used in the bolt assembly.
Figure 7:
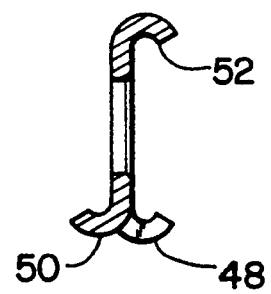
FIG. 7 is a sectional view taken along lines of FIG. 6.
Figure 5:
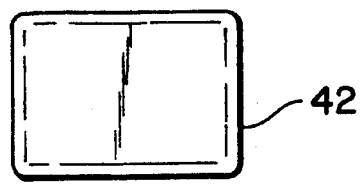
FIG. 5 is an end view in elevation of the bolt head.
Figure 4:
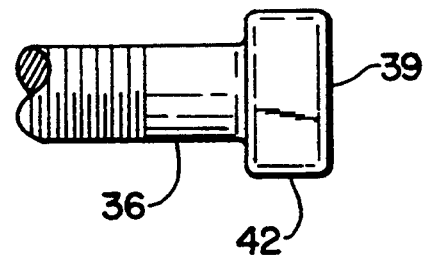
FIG. 4 is a partial view of the bolt used to attach the rotors.

According to this invention, the overhung flanges of adjacent disks is best viewed in FIGS. 2 and 3 that show a partial view of the circular rotor disk 16 having an offset carrying the overhung flange 26 that is scalloped on the inner diameter 32 and has formed therein a plurality of equally spaced slots 34. Slots 34 are sufficiently wide to accommodate the shank 36 of bolt 39 of the assembly 30. The adjacent overhung flange of rotor 14 includes an equal number of and in circumferential alignment the holes 38 and it likewise may be scalloped on the inner diameter 40. The head 42 of bolt is dimensioned to provide the minimal axial dimension to assure that the offset, namely, the distance between the overhung of flange 26 and disk 16 is at the minimum. An anti-rotation clip 44 may be employed to prevent the bolt from rotating when assembling and disassembling the rotor assembly. In this embodiment the clip 44 is preferred. Clip 44 is fabricated from a relative square sheet metal that is preformed to include a central aperture for receiving bolt 39, a pair of aft facing tangs 46 and 48 at the left and right bottom edges as viewed in the drawing and a fore facing tang 50 spaced therebetween. An aft facing tang 52 is formed on the top of clip 44 and the gap between the aft facing tangs 46, 48 and 52 is dimensioned to accommodate the span between opposite flats of head 42 of bolt 39.

The width of tang 50 is dimensioned to fit into slot 34 so that the side edges of the tang 50 bear against the opposing side walls 56 and 58 to assure that the head 42 and hence bolt 39 does not rotate.

As apparent from the foregoing to assemble the rotor spool adjacent rotors are oriented in the vertical position and are aligned so that the slots 34 and holes 38 are in circumferential alignment. Immediately prior to aligning the adjacent rotors, clip 44 is mounted on bolt 39 such that the bendable tangs 46, 48 and 52 are bent in situ to engage the flats of bolt 39 and then inserted in the slot 34 by dropping the assembled bolt 39 and clip 44 radially into slot 34. Beeswax or other wax material may be applied to the bolt head to help position the bolt and prevent scratches from occurring. Next the adjacent rotor is lowered onto the adjacent rotor such that the holes 38 align with slots 34 and the bolt holes 38 engage the bolt shank 36 which fixes the bolt 39 in the radial direction. The last step in the assembly procedure is to thread the nut 60, which may be of the well known and commercially available self-locking type. The clip 44 prevents the bolt from rotating and allows the fastening of the nut/bolt assembly 30. It will be appreciated that the clip is located in the low stress area of slot 34.

Although this invention has been shown and described with respect to detailed embodiments thereof, it will be appreciated and understood by those skilled in the art that various changes in form and detail thereof may be made without departing from the spirit and scope of the claimed invention.

We claim:

1. For a compressor of a gas turbine engine including a plurality of rotors each having a disk, said disk including an offset, at least two adjacent rotors of said plurality of rotors each having mating flanges disposed on said offset of each of said two adjacent rotors adapted to connect said adjacent rotors, one of said mating flanges having a plurality of radial extending circumferentially spaced slots and the other of said mating flanges having a plurality of circumferentially spaced holes dimensioned to complement said slots, means including a bolt having a head portion for connecting said slots and said holes for attaching adjacent rotors, anti-rotational means formed from a flat sheet metal stock and including a central aperture for receiving said bolt and being captured by the bolt and the slotted flange, and said offset of said one of said mating flanges being dimensioned to axially extend from said disk substantially the width of said head portion whereby the weight of the disk is minimized and the fatigue life of the rotor is enhanced.

2. For a compressor as claimed in claim 1 wherein said bolt passing through one of said slots and said hole and said bolt includes a threaded end portion disposed remote from said head portion.

3. For a compressor as claimed in claim 2 including a nut threadably attached to said threaded end portion.

4. For a compressor as claimed in claim 3 wherein said flange having said slots is scalloped between adjacent slots.

5. For a compressor as claimed in claim 4 wherein said flange having said holes is scalloped between adjacent holes.

6. For a compressor as claimed in claim 5 wherein said head portion includes a plurality of circumferentially spaced flats, said sheet metal stock of said anti-rotation means defines a flat plate-like member having a top and bottom, said plate-like member having a bendable tang on said top bent in situ to engage one of said flats, at least one axially extending tang at the bottom to fit into said one of said slots and being dimensioned to extend substantially the width of said one of said slots so as to fit snugly in said slot and engage the side walls of said one of said slots to prevent rotation of said bolt.

7. For a compressor as claimed in claim 6 wherein said plate-like member includes an additional pair of bendable tangs at said bottom and bendable in situ to engage another of said flats.

8. An anti-rotational clip for preventing rotation of a bolt relative to a member being attached by said bolt, said bolt having a shank portion and a bolt head on one end of said shank portion, said bolt head having a plurality of flats formed around the circumference of said bolt head, said shank being fitted into a slot formed in said member being attached, said anti-rotational clip including a flat rectangularly shaped member having a top and bottom, a first tang formed on said top that is bendable in situ to engage one of said flats, a second tang formed on said bottom to fit into said slot and being dimensioned to extend in a circumferential direction to substantially the side walls of said slot whereby the anti-rotational clip prevents the rotation of said bolt and allows a nut to be threaded to threads formed on the end of said shank remote from said bolt head.

9. An anti-rotational clip as claimed in claim 8 including at least a third tang mounted on said bottom bent in situ to engage another of said flats.

10. An anti-rotational clip as claimed in claim 9 including a fourth tang mounted on said bottom bent in situ to engage said another of said flats and said third tang and said fourth tang disposed at either end of said bottom relative to said second tang.

11. Means for attaching adjacent rotors which rotors include disks and an offset overhung flanges formed on said offset of said adjacent rotors facing each other, circumferentially spaced radial slots formed on the distal end of one of said overhung flanges and holes formed in the other overhung flange dimensioned to complement the width of said slots, a bolt including a shank and a head, said head having side facing flats and said shank extending through each of said slots and complementing holes, said head being disposed between one of said slots and one of said disks of one of said adjacent rotors, an anti-rotational clip having a central hole for receiving said shank between said one of said slots and said head, said clip having a top and bottom, a bendable tang on said top bent in situ to engage one of said flats and another bendable tang on said bottom bent in situ to fit into said one of said slots and said another bendable tang being sized to extend substantially to the side walls of said one of said slots to prevent rotation of said bolt.

12. Means as claimed in claim 11 including an additional tang formed on said bottom being axially spaced from said another bendable tang and bent in situ to engage one of said side facing flats on said bolt head.

* * * * *

UNITED STATES PATENT AND TRADEMARK OFFICE
CERTIFICATE OF CORRECTION

PATENT NO. : 5,388,963

DATED : February 14, 1995

INVENTOR(S) : John H. Dimmick, III, et al

It is certified that error appears in the above-identified patent and that said Letters Patent is hereby corrected as shown below:

```
In the Abstract, on line 10, after the  words
"into the" insert --slot--; On line 11,
delete "slot".
```

Signed and Sealed this

Eleventh Day of April, 1995

Attest:

BRUCE LEHMAN

Attesting Officer    Commissioner of Patents and Trademarks